United States Patent [19]

Schmidt et al.

[11] Patent Number: 4,536,561
[45] Date of Patent: Aug. 20, 1985

[54] THERMOTROPIC, WHOLLY AROMATIC POLYESTERS

[75] Inventors: Manfred Schmidt; Hans-Rudolf Dicke, both of Krefeld, Fed. Rep. of Germany

[73] Assignee: Bayer Aktiengesellschaft, Leverkusen, Fed. Rep. of Germany

[21] Appl. No.: 627,972

[22] Filed: Jul. 3, 1984

[30] Foreign Application Priority Data

Jul. 16, 1983 [DE] Fed. Rep. of Germany ....... 3325787

[51] Int. Cl.³ ............................................. C08G 63/60
[52] U.S. Cl. ................................... 528/191; 528/176; 528/193; 528/194; 528/271
[58] Field of Search ............... 528/176, 190, 191, 193, 528/194, 271

[56] References Cited

U.S. PATENT DOCUMENTS

| | | | |
|---|---|---|---|
| 4,146,702 | 3/1979 | Morris et al. | 528/191 |
| 4,269,965 | 5/1981 | Irwin | 528/191 |
| 4,374,228 | 2/1983 | Langley | 528/191 |
| 4,447,593 | 5/1984 | Funakoshi et al. | 528/191 |

Primary Examiner—Lester L. Lee
Attorney, Agent, or Firm—Connolly and Hutz

[57] ABSTRACT

Thermotropic, wholly aromatic polyesters containing condensed residues of
(a) p-hydroxy benzoic acid,
(b) 3-chloro-4-hydroxy benzoic acid,
(c) isophthalic acid,
(d) hydroquinone and
(e) 3,4'- and/or 4,4'-dihydroxy-diphenyl, -diphenyl ether and/or -diphenyl sulphide have high rigidity and toughness and yet are easily processable.

3 Claims, No Drawings

THERMOTROPIC, WHOLLY AROMATIC POLYESTERS

The present invention relates to high molecular weight thermotropic, wholly aromatic polyesters having high rigidity and impact strength and advantageous melt viscosities, a process for their production, and their use in the manufacture of molded articles, filaments, fibres and films.

The term "thermotropic" is applied to those polycondensates which form liquid-crystalline melts. They are well known; see, for example, F. E. McFarlane et al., Liquid Crystal Polymers II, Contemporary Topics in Polymer Science, Vol. 2, Plenum Publishing Corporation, 1977;

W. J. Jackson and H. F. Kuhfuss, J. Polymer Science, Polymer Chem. Ed. 14, 2042 (1976);

W. C. Wooten et al. in A. Ciferri "Ultra-high Modulus Polymers", Applied Science Publ., London 1979, Page 362 et seq;

A. Blumstein et al., "Liquid Crystalline Order in Polymers", Academic Press 1978;

EP 22 344, 24 499, 15 856, 17 310, 15 088, 8 855, WO 79/01034, 79/797 and DE-OS 2 751 653.

The liquid-crystalline state of the polycondensate melts may be examined by means of a polarisation microscope. For these investigations, the eye piece was equipped with an attachment containing a photoelectric diode at the focus of the lens. Using a measurement amplifier connected in series and equipped with a control device, the measured value obtained when the microscope was switched on in the absence of a material sample and with the nicol prisms arranged in parallel, was adjusted to 100 divisions on the scale. The value obtained with crossed nicol prisms was then 0.01 scale divisions.

The layer thickness of the polycondensate melts examined was 100 μm.

Examination of the liquid-crystalline melts was carried out after the samples had been melted at temperatures of from 280° to 400° C. If a liquid-crystalline melt was observed within either the whole or a part of this temperature range, the polycondensate was classified as thermotropic.

In order to ensure that the optical anisotropy of the melts was due to a liquid-crystalline state and not to any crystals of polycondensate floating in the melt, the sample of melt was heated to raise the temperature thereof by a further 30° C. after the measurement had been carried out. Any crystals would melt under these conditions, so that the optical anisotropy of the melt would disappear. Only if brightening of the melt observed between the nicol prisms persisted inspite of further heating the polycondensates were classified as thermotropic. In the measuring system, these polycondensates showed values of over 1 scale division, in most cases values of from 3 to 90 divisions on the scale, whereas amorphous melts, e.g. of aromatic polycarbonates, showed values of less than 0.1 scale division.

The method described above is particularly suitable for a rapid laboratory determination and provides unequivocal results in almost all cases. In cases of doubt, however, it may be advisable to confirm the presence of liquid-crystalline components by wide angle X-ray scattering in the melt, as described, for example, in "Plastic Crystals, Physico-Chemical Properties and Methods of Investigation", by G. W. Gray and P. A. Windsor, in particular Chapter 3, John Wiley & Sons, New York, Sydney, Toronto 1974.

German Offenlegungsschrift No. 2,025,971 relates to high molecular weight, wholly aromatic polyesters based on p-hydroxy benzoic acid, aromatic dicarboxylic acids (such as terephthalic and isophthalic acid) and diphenols (such as hydroquinone or 4,4'-dihydroxybiphenyl). These polyesters are thermotropic due to the components used. They may, for example, be processed into fibres. Of the 13 polyesters given in the examples, only one melts at a temperature below 300° C.; in other words, these polyesters are not easily processable.

Moulded articles produced from liquid-crystalline melts have mechanical strengths of a quality not normally found in unreinforced polycondensates produced from isotropic melts; the toughness of such moulded products, however, is not entirely satisfactory (see U.S. Pat. No. 4,242,496, EP No. 44 175, W. J. Jackson Jr., Brit. Polym. J. 12, 154 (1980)). Our own investigations have confirmed that high strength thermotropic polyesters generally have little toughness whereas thermotropic polyesters which are very tough generally have less strength.

It was therefore an object of the present invention to provide thermotropic, wholly aromatic polyesters which would be more easily processable than the polyesters according to DE-OS No. 2,025,971 and yet have excellent mechanical properties.

It was a further object of the present invention to provide thermotropic, wholly aromatic polyesters which may be processed by thermoplastic moulding into articles which would have both high mechanical strength and excellent toughness.

Preferred novel thermotropic wholly aromatic polyesters should have an impact strength of at least 20–30kJ/m$^2$ preferably of at least 40 kJ/m$^2$ and they should also have a notched impact strength of at least 10–20 kJ/m$^2$ and preferably of at least 25 kJ/m$^2$. In addition, these preferred polyesters should have an E-modulus under bending of at least 4,500–5,000 and preferably of at least 6,000.

Surprisingly, it has been found that wholly aromatic polyesters containing condensed residues of p-hydroxy benzoic acid, 3-chloro-4-hydroxy benzoic acid, isophthalic acid, hydroquinone and 3,4'- and/or 4,4'-dihydroxy-diphenyl, -diphenyl ether and/or -diphenyl sulphide have the desired combination of adventageous properties.

Accordingly the present invention provides thermotropic, wholly aromatic polyesters based on
(a) p-hydroxy benzoic acid,
(b) 3-chloro-4-hydroxy benzoic acid,
(c) isophthalic acid,
(d) hydroquinone and
(e) 3,4'- and/or 4,4'-dihydroxy-diphenyl, 3,4'- and/or 4,4-dihydroxy-diphenyl ether and/or 3,4'- and/or 4,4'-dihydroxy-diphenyl sulphide, said polyesters containing the condensed residues of
(a) at a concentration of from 25 to 65, preferably from 30 to 50, in particular from 35 to 47 mol %, the condensed residues of
(b) at a concentration of from 5 to 40, preferably from 10 to 30, in particular from 15 to 27 mol %, the condensed residues of
(c) at a concentration of from 30 to 50 mol % and the condensed residues of
(e) at a concentration of from 1 to 10, preferably from 2 to 6 mol %, based in each case on the sum of condensed residues (a), (b) and (c), under the proviso that the sum of the concentrations of (a) and (b) amounts to a minimum of 50 mol % and a maximum of 70 mol % and that the molar ratio of the condensed residues c/ (d+e) is from 0.95 to 1.05.

The p-hydroxy benzoic acids of (a) may be substituted in the nucleus by 1 or 2 $C_1$-$C_4$ alkyl, $C_1$-$C_4$ alkoxy, $C_6$-$C_{10}$ aryl or $C_7$-$C_{12}$ alkylaryl groups (such as phenyl, tolyl, or naphthyl), e.g. 4-hydroxy-2-methylbenzoic acid, 4-hydroxy-3-methyl-benzoic acid, 2-ethyl-4-hydroxy-benzoic acid, 3-ethyl-4-hydroxy-benzoic acid, 4-hydroxy-2-phenyl-benzoic acid or 4-hydroxy-3-phenylbenzoic acid, but unsubstituted p-hydroxy benzoic acid is particularly preferred.

The residues of compounds (a) to (e) may be contained in the polyesters according to the invention in statistical distribution, in segments or in blocks. Concerning components (a) and (b), it should be remembered that long or relatively long blocks may considerably increase the melting point and the melt viscosity.

The polyesters according to the invention may contain, COOH, H, OH, $OC_6H_5$, acyloxy or groups derivided from chain terminating agents as end groups. Preferred chain terminators include monofunctional, aromatic hydroxyl compounds, such as 4-hydroxy-diphenyl, p-nonylphenol, 4-(1,1,3,3-tetramethyl-butyl)-phenol or β-naphthol, and aromatic monocarboxylic acids, such as diphenyl carboxylic acids and naphthalene carboxylic acids. Chain terminating agents may be used in quantities of from 0.5 to 5 mol %, based on the sum of components a and b.

Branching compounds in the form of trifunctional or higher functional, preferably aromatic monomers, such as phloroglucinol, 1,3,5-benzene-tricarboxylic acid, isocyanuric acid and 3,5-dihydroxy benzoic acid may also be used, in quantities of from 0.1 to 1 mol %, based on the sum of components (a) and (b).

The polyesters according to the present invention preferably have a melt viscosity below 1,000 Pa.s, determined at a shearing velocity of $10^3 \sec^{-1}$, using a nozzle having a length/diameter ratio of 20 at a temperature below 360° C., preferably below 330° C.

The polyesters according to the invention may be prepared by various methods, e.g. by the condensation or transesterification of reactive derivatives of the compounds (a) to (d), e.g. of their esters or acid chlorides, followed by polycondensation.

Examples of preferred starting compounds therefore include the aryl esters, acyl esters and acid chlorides of the said compounds.

According to a preferred method of synthesis, the lower acyl esters, preferably acetates, of compounds (a), (c) and (d) are reacted with isophthalic acid (b), the acyl esters being optionally prepared in situ.

The residues of compounds (a) to (d) are incorporated in the polyesters in the proportions in which the starting components are used.

The polyesters according to the present invention are preferably free from carbonate groups.

Both the condensation or transesterification reactions and the polycondensation reactions are preferably accelerated by means of catalysts. Suitable catalysts for this purpose are well known, e.g. Lewis acids and hydrohalic acids; oxides, hydrides, hydroxides, halides, alcoholates, phenolates, salts of inorganic or organic acids (preferably carboxylic acids), complex salts or mixed salts of a alkaline earth metals such as magnesium or calcium; of sub-group elements such as vanadium, titanium, manganese, cobalt, nickel, zinc, lanthanum, cerium, or zirconium or of elements from other groups of the periodic system, such as germanium, tin, lead or antimony; or also the alkali metals or alkaline earth metals themselves, in particular sodium; also, sodium hydroxide, lithium acetate, sodium acetate, potassium acetate, calcium acetate, magnesium acetate, cobalt acetate, zinc acetate, calcium benzoate, magnesium acetyl acetonate, zinc acetyl acetonate, vanadyl $C_1$-$C_8$-alkoxides, titanium alkoxides such as titanium tetrabutylate or titanium tetrapropylate, alkoxytitanium silicates, zirconium butylate, zirconium propylate, titanium tetraphenolate, sodium phenolate, germanium dioxide, antimony trioxide, dialkyl- and diaryl-tin oxide, di-butyl-tin-diacetate and dibutyl-dimethoxy-tin. Particularly preferred are the acetates of magnesium, manganese, sodium, potassium and zinc.

The quantities of catalyst used are preferably from 0.001 to 1% by weight, in particular from 0.01 to 0.2% by weight, based on the total weight of monomers put into the process.

The polyesters according to the present invention may be produced at temperatures of from 160° to 370° C., the reaction being generally started at a lower temperature and the temperature being continuously raised as the reaction progresses. A vacuum may be applied when the rate of reaction diminishes, the pressure being preferably lowered continuously from normal pressure to about 0.1 mbar.

The product obtained may be subjected to a solid phase post-condensation under reduced pressure at temperatures of from 200° to 300° C., preferably in the form of a granulate. After 5 to 25 hours, the molecular weight has increased and the properties of the polyester have, as a result, markedly improved.

The present invention further relates to a process for the production of the new polyesters by the reaction of components (a) to (d) or of their reactive derivatives which may also be prepared in situ, optionally in the presence of chain terminators, branching agents and catalysts, at temperatures of from 160° to 370° C., optionally under reduced pressure.

The thermotropic polyesters according to the present invention may, by virtue of their relatively low melt viscosity, advantageously be processed from the molten state to produce injection moulded articles, filaments, fibres, bands and films, the shearing forces occurring in the process giving rise to a molecular orientation which is influenced to a large extent by the magnitude of the shearing forces. The thermotropic polyesters also have a pronounced structural viscosity, which means that the melt viscosity drops sharply when the shearing forces increase. Suitable methods of processing include injection moulding, extrusion, pressing and melt spinning.

The polyesters according to the invention may be used to produce moulded articles having high tensile strength, exceptional toughness and great dimensional stability. Since these polyesters have exceptional chemical resistance as well as being flame resistant, they are particularly suitable for the manufacture of electrotechnical articles such as insulators, printed circuits, plugs and parts of instrument panels; parts of industrial chemical apparatus, such as pipes, container linings, rotors, antifriction bearings and seals; parts for the internal equipment of aircraft; the parts of technical apparatus used for medical purposes, e.g. parts of air conditioning plants and valves.

The polyesters according to the present invention may also be used as covering and coating materials (in the form of powders or dispersions). They are also most suitable for the production of reinforced or filled moulding compounds containing from 5 to 65% by weight of reinforcing agent or filler, based on the total weight of reinforced or filled moulding compound.

The present invention thus also relates to the use of the new polyesters for the manufacture of moulded articles, filaments, fibres and films.

EXAMPLES

The impact strength $a_n$ and notched impact strength $a_k$ were tested on small standard test rods according to DIN 53 453 (ISO/R 179) at 23° C., using 10 test samples for each test. The flexural strength was determined on standard test rods according to DIN 53 452 (ISO/R 178). The flexural E-modulus was determined according to DIN 53 457. The dimensional stability under heat was determined by carrying out measurements of the vicat-B-softening temperature according to DIN 53 469 (ISO 306).

Comparison 1

The following substances were weighed into a 1 liter, ground glass vessel equipped wth a ground glass lid, a stirrer, a nitrogen inlet and a distillation attachment connected to a condenser:
331.4 g (2.4 mol) of p-hydroxy-benzoic acid,
239.2 g (1.44 mol) of isophthalic acid,
132.1 g (1.2 mol) of hydroquinone,
46.64 g (0.24 mol) of 4,4'-dihydroxy-diphenyl ether,
615 g (6 mol) of acetic anhydride,
0.1 g of magnesium acetate and
0.05 g of antimony trioxide.

The reaction mixture was heated to 170° C. on a salt bath under a nitrogen atmosphere. As soon as the distillation of acetic acid slowed down (after 1 hour), the temperature in the reaction vessel was raised to 250° C. in the course of 2 hours and then to 300° C. in the course of a further 2 hours. After distillation was completed, the pressure was lowered to about 1 mbar in the course of 40 minutes. The polyester obtained was granulated (length 2 mm) and post-condensed for a further 12 hours in the solid phase under nitrogen at 250° C.

COMPARISON 2

Using a method analogous to Comparison 1,
172.25 g (1.263 mol) of p-hydroxy benzoic acid,
190.98 g (1.052 mol) of 3-chloro-4-hydroxy benzoic acid,
2.52 g (0.012 mol) of trimesic acid,
195.05 g (1.175 mol) of isophthalic acid,
131.31 g (1.193 mol) of hydroquinone and
527.98 g (5.612 mol) of acetic anhydride
were reacted in the presence of 0.1 g of zinc acetate and 0.05 g of antimony trioxide and then subjected to a solid phase post-condensation (250° C./12 hours).

EXAMPLE 1

Using a method analogous to that of comparison 1,
190.76 g (1.382 mol) of p-hydroxy benzoic acid,
150.54 g (0.892 mol) of 3-chloro-4-hydroxybenzoic acid,
22.5 g (0.121 mol) of 4,4'-dihydroxy-diphenyl,
123.59 g (1.123 mol) of hydroquinone,
206.52 g (1.244 mol) of isophthalic acid and
564.55 g (5.59 mol) of acetic anhydride
were reacted in the presence of 0.05 g of manganese-(II)-acetate and 0.02 g of antimony trioxide and subjected to a solid phase post-condensation (250° C./16 hours).

EXAMPLE 2

Using a method analogous to that of Example 1,
190.58 g (1.181 mol) of p-hydroxy-benzoic acid,
116.52 g (0.642 mol) of 3-chloro-4-hydroxy-benzoic acid,
197.26 g (1.188 mol) of isophthalic acid,
109.60 g (0.995 mol) of hydroquinone,
38.93 g (0.193 mol) of 4,4'-dihydroxy-diphenyl ether and
524.66 g (5.14 mol) of acetic anhydride
were reacted in the presence of 0.3 g of magnesium acetate and 0.2 g of antimony trioxide and subjected to a solid phase post-condensation (220° C./16 hours).

EXAMPLE 3

Using a method analogous to that of Example 1,
190.34 g (1.379 mol) of p-hydroxy-benzoic acid,
114.40 g (0.63 mol) of 3-chloro-4-hydroxy-benzoic acid,
197.90 g (1.192 mol) of isophthalic acid,
109.49 g (0.994 mol) of hydroquinone,
38.38 g (0.192 mol) of 4,4'-dihydroxy-diphenyl ether,
1.69 g (0.011 mol) of 3,4-dihydroxy-benzoic acid and
524.3 g (5.134 mol) of acetic anhydride
were reacted in the presence of 0.3 g of zinc acetate and 0.2 g of germanium dioxide and subjected to a solid phase post-condensation (250° C./10 hours).

All the polycondensate obtained were insoluble in the usual organic solvents. They were injection molded at temperatures of the polycondensates of from 280° to 300° C. The results obtained from testing the properties were as follows:

| Example | Vicat-T-Temp. (°C.) | $a_n/a_{k2}$ (kJ/m$^2$) | Flexural strength (MPa) | Flexural-E-Modulus (MPa) | Viscosity* [pa · s] |
| --- | --- | --- | --- | --- | --- |
| Comparison 1 | 130 | 42/27 | 160 | 6.100 | 460/280° C. |
| Comparison 2 | 147 | 12/8 | 190 | 11.500 | 500/320° C. |
| 1 | 133 | 52/42 | 232 | 10.260 | 300/320° C. |
| 2 | 130 | 41/33 | 210 | 9.300 | 700/280° C. |
| 3 | 132 | 60/40 | 225 | 10.050 | 600/280° C. |

*Melt viscosity at a shearing velocity of $10^3$ sec$^{-1}$ at the given temperature.

We claim:

1. A thermotropic, wholly aromatic polyester comprising condensed residues of monomeric units (a) through (e) wherein:
   (a) is p-hydroxyl-benzoic acid or p-hydroxyl-benzoic acid substituted in the nucleus by one or two $C_1$–$C_4$ alkyl, $C_1$–$C_4$ alkoxy $C_6$–$C_{10}$ aryl or $C_7$–$C_{12}$ alkylaryl groups,
   (b) is 3-chloro-4-hydroxy-benzoic acid,
   (c) is isophthalic acid,
   (d) is hydroquinone and
   (e) is selected from 3,4'-dihydroxy-diphenyl, 4,4'-dihydroxydiphenyl, 3,4'-dihydroxy-diphenyl ether, 4,4'-dihydroxy-diphenyl sulphide, and mixtures thereof, wherein said polyester contains the condensed residues of (a) at a concentration of from 25 to 65 mol %,
(b) at a concentration of from 5 to 40 mol %,
(c) at a concentration of from 30 to 50 mol %, and
(d) at a concentration of from 1 to 10 mol %, each based on the sum of the condensed residues (a), (b) and (c), with the proviso that the sum of concentrations of (a) and (b) amounts to a minimum of 50 mol % and a maximum of 70 mol % and that the molar ratio of the condensed residues $c/(d+e)$ is from 0.95 to 1.05.

2. A polyester according to claim 1 wherein the polyester contains the condensed residues of
   (a) at a concentration of from 35 to 47 mol % and the condensed residues of
   (b) at a concentration of from 15 to 27 mol %, based in each case on the sum of the condensed residues (a), (b) and (c).

3. Polyester articles in the form of moulded articles, filaments, fibers and films fabricated from the polyester according to claim 1.

* * * * *